United States Patent
Chang et al.

(10) Patent No.: US 12,542,648 B2
(45) Date of Patent: Feb. 3, 2026

(54) CLOCK DATA RECOVERY CIRCUIT

(71) Applicant: Novatek Microelectronics Corp., Hsinchu (TW)

(72) Inventors: Wei Cheng Chang, Hsinchu (TW); Cheng-Yu Liu, Hsinchu (TW); Chien Wei Peng, Taoyuan (TW); Chiao Wei Hsiao, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 7 days.

(21) Appl. No.: 18/671,884

(22) Filed: May 22, 2024

(65) Prior Publication Data
US 2025/0247202 A1 Jul. 31, 2025

(30) Foreign Application Priority Data
Jan. 29, 2024 (TW) ................................. 113103262

(51) Int. Cl.
*H04L 7/033* (2006.01)
(52) U.S. Cl.
CPC .................................. *H04L 7/0331* (2013.01)
(58) Field of Classification Search
CPC ....... H03L 7/089; H03L 7/1072; H03L 7/107; H03L 7/0995; H03L 7/0891; H03L 7/091; H03L 7/0991; H03L 2207/50; H03L 7/08; H04L 7/0331
See application file for complete search history.

(56) References Cited

U.S. PATENT DOCUMENTS 8,125,254 B1 * 2/2012 Ding ..................... H03L 7/089
331/10
8,334,725 B2 12/2012 Wang et al.
(Continued)

FOREIGN PATENT DOCUMENTS

| TW | I367633 | 7/2012 |
|---|---|---|
| TW | 202007085 | 2/2020 |

OTHER PUBLICATIONS

"Office Action of Taiwan Counterpart Application", issued on Dec. 17, 2024, p. 1-p. 5.
(Continued)

*Primary Examiner* — Khanh C Tran
(74) *Attorney, Agent, or Firm* — JCIPRNET (57) ABSTRACT

A clock data recovery (CDR) circuit includes a phase detector circuit, a proportional path, an integral path, and an oscillator circuit. The phase detector circuit is configured to receive input data and detect the input data based on an oscillation signal to output a detection result. The proportional path is configured to output a proportional control signal based on the detection result. The proportional path includes a charge pump circuit and a variable capacitor. The charge pump circuit generates a voltage control signal based on the detection result. The variable capacitor generates the proportional control signal based on the voltage control signal. The integral path is configured to output an integral control signal based on the detection result. The oscillator circuit is coupled to the proportional path and the integral path and configured to generate the oscillation signal based on the proportional control signal and the integral control signal.

19 Claims, 6 Drawing Sheets

(56) References Cited

U.S. PATENT DOCUMENTS

| | | | |
|---|---|---|---|
| 8,638,141 B1* | 1/2014 | Lamanna | H03L 7/093 327/156 |
| 8,952,759 B2 | 2/2015 | Wang et al. | |
| 10,778,405 B2 | 9/2020 | Liu et al. | |
| 2003/0091139 A1 | 5/2003 | Cao | |
| 2008/0253492 A1 | 10/2008 | Wang et al. | |
| 2012/0201289 A1* | 8/2012 | Abdalla | H04L 25/0272 375/232 |
| 2013/0069700 A1 | 3/2013 | Wang et al. | |
| 2015/0349783 A1 | 12/2015 | Shibasaki | |
| 2017/0077933 A1* | 3/2017 | Zhang | H03L 7/093 |
| 2019/0173475 A1 | 6/2019 | Choi | |
| 2020/0021425 A1 | 1/2020 | Liu et al. | |
| 2020/0287554 A1* | 9/2020 | Liu | H03L 7/0891 |

OTHER PUBLICATIONS

Alvin L. S. Loke et al., "A Versatile 90-nm CMOS Charge-Pump PLL for SerDes Transmitter Clocking", IEEE Journal of Solid-State Circuits, vol. 41, No. 8, Aug. 2006, pp. 1-15.

Dennis Michael Fischette et al., "A 45nm SOI-CMOS Dual-PLL Processor Clock System for Multi-Protocol I/O", 2010 IEEE International Solid-State Circuits Conference—(ISSCC), Feb. 7-11, 2010, pp. 1-4.

Robert Bogdan Staszewski et al., "Digitally Controlled Oscillator (DCO)-Based Architecture for RF Frequency Synthesis in a Deep-Submicrometer CMOS Process", IEEE Transactions on Circuits and Systems II: Analog and Digital Processing, vol. 50, No. 11, Nov. 2003, pp. 815-828.

* cited by examiner

CLOCK DATA RECOVERY CIRCUIT

CROSS-REFERENCE TO RELATED APPLICATION

This application claims the priority benefit of Taiwan application serial no. 113103262, filed on Jan. 29, 2024. The entirety of the above-mentioned patent application is hereby incorporated by reference herein and made a part of this specification.

BACKGROUND

Technical Field

The disclosure relates a clock data recovery (CDR) circuit and particularly relates to a CDR circuit based on phase-locked loops (PLL).

Description of Related Art

For high-speed serial buses, it is common to embed clock signal information into a to-be-transmitted data stream through data encoding. Subsequently, the clock information is obtained at a receiving terminal through clock recovery, and the recovered clock signal is used to sample input data. The purpose of clock recovery is to track a clock offset of a transmitting terminal to ensure accurate data sampling. A clock data recovery (CDR) circuit may be implemented based on a phase-locked loop (PLL) architecture. However, in the current architecture of the CDR circuit, a gain of a proportional path may be reduced due to the influence of parasitic capacitance, thus leading to the failure of the CDR circuit to sample the data correctly.

SUMMARY

The disclosure provides a clock data recovery (CDR) circuit that may improve the accuracy of data sampling.

According to an embodiment of the disclosure, a CDR circuit includes a phase detector circuit, a proportional path, an integral path, and an oscillator circuit. The phase detector circuit is configured to receive input data and detect the input data based on an oscillation signal to output a detection result. The proportional path is configured to output a proportional control signal based on the detection result, where the proportional path includes a charge pump circuit and a variable capacitor, the charge pump circuit generates a voltage control signal based on the detection result, and the variable capacitor generates a proportional control signal based on the voltage control signal. The integral path is configured to output an integral control signal based on the detection result. The oscillator circuit is coupled to the proportional path and the integral path, and the oscillator circuit is configured to generate the oscillation signal based on the proportional control signal and the integral control signal.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

The terminology "couple (or connect)" used throughout the whole description of the disclosure (including the claims) may refer to any direct or indirect connection means. For instance, if the disclosure describes that a first device is coupled (or connected) to a second device, it should be interpreted that the first device may be directly connected to the second device, or that the first device may be indirectly connected to the second device through other devices or certain connection means. The terminologies such as "first" and "second" mentioned in the description of the disclosure (including the claims) are used to name different elements or to distinguish different embodiments or scopes and are not intended to limit the upper or lower limit of the number of the elements, nor are they intended to limit the manufacturing order or disposition order of the elements. Moreover, wherever possible, elements/components/steps with the same reference numbers in the drawings and the embodiments denote the same or similar parts. Cross-reference may be made to related descriptions of elements/components/steps with the same reference numbers or the same terminologies in different embodiments.

Figure 1:
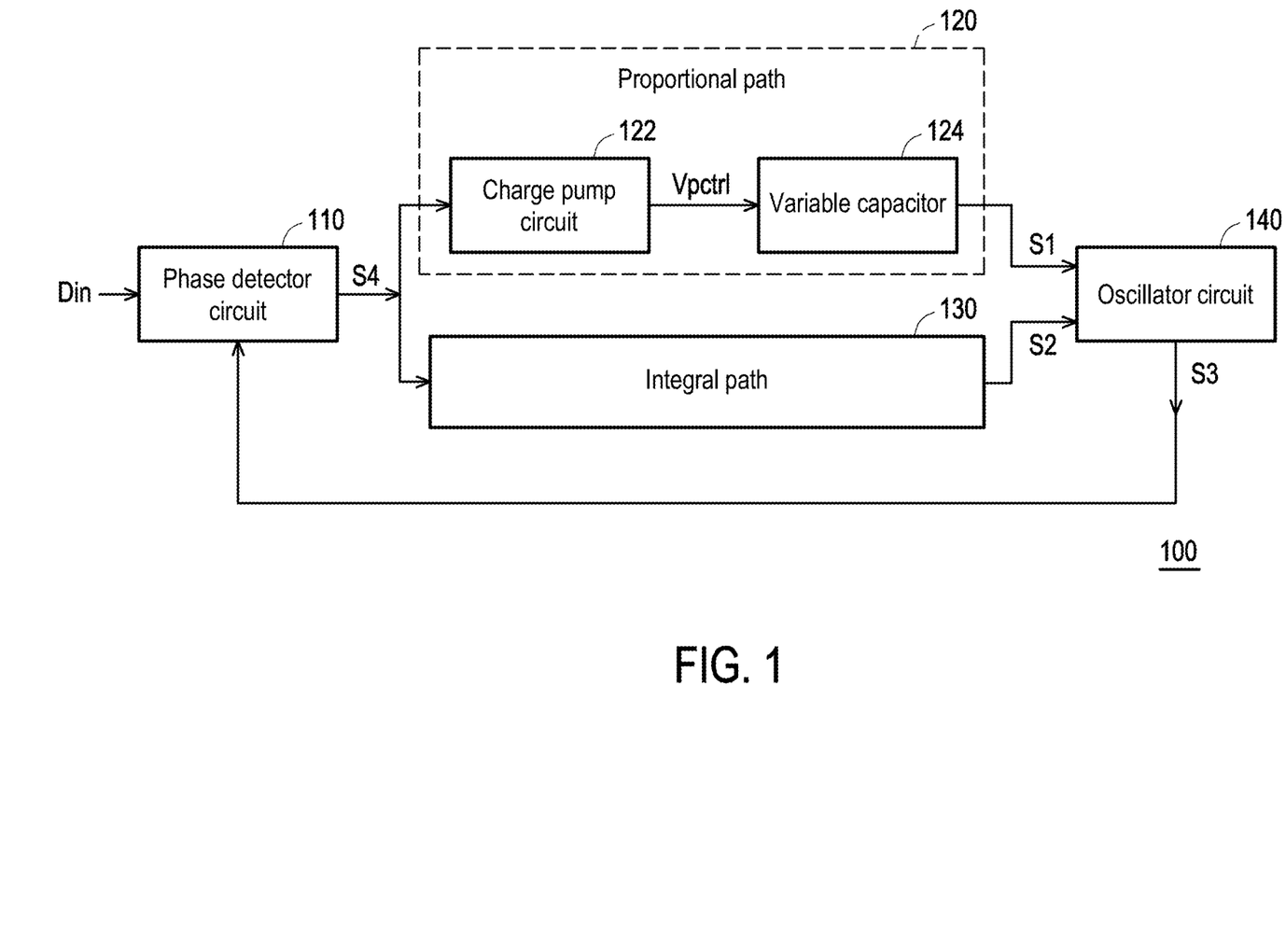
FIG. 1 is a schematic block view of a clock data recovery (CDR) circuit according to an embodiment of the disclosure.

FIG. 1 is a schematic block view of a clock data recovery (CDR) circuit according to an embodiment of the disclosure. With reference to FIG. 1, a CDR circuit 100 includes a phase detector circuit 110, a proportional path 120, an integral path 130, and an oscillator circuit 140. The oscillator circuit 140 is coupled to the proportional path 120 and the integral path 130.

The oscillator circuit 140 is configured to generate an oscillation signal S3 based on a proportional control signal S1 and an integral control signal S2. The phase detector circuit 110 is configured to receive input data Din and detect the input data Din based on the oscillation signal S3 to output a detection result S4. Detection operations of the phase detector circuit 110, for instance, include but are not limited to operations of sampling and phase detection of the input data Din.

The proportional path 120 is configured to output the proportional control signal S1 based on the detection result S4. The proportional path 120 includes a charge pump circuit 122 and a variable capacitor 124. The charge pump circuit 122 may generate a voltage control signal Vpctrl based on the detection result S4. The voltage control signal Vpctrl may be configured to adjust a capacitance of the variable capacitor 124, so as to avoid the gain of the proportional path 120 from being reduced due to the influence of a parasitic capacitance. The integral path 130 is configured to output the integral control signal S2 based on the detection result S4.

Figure 2:
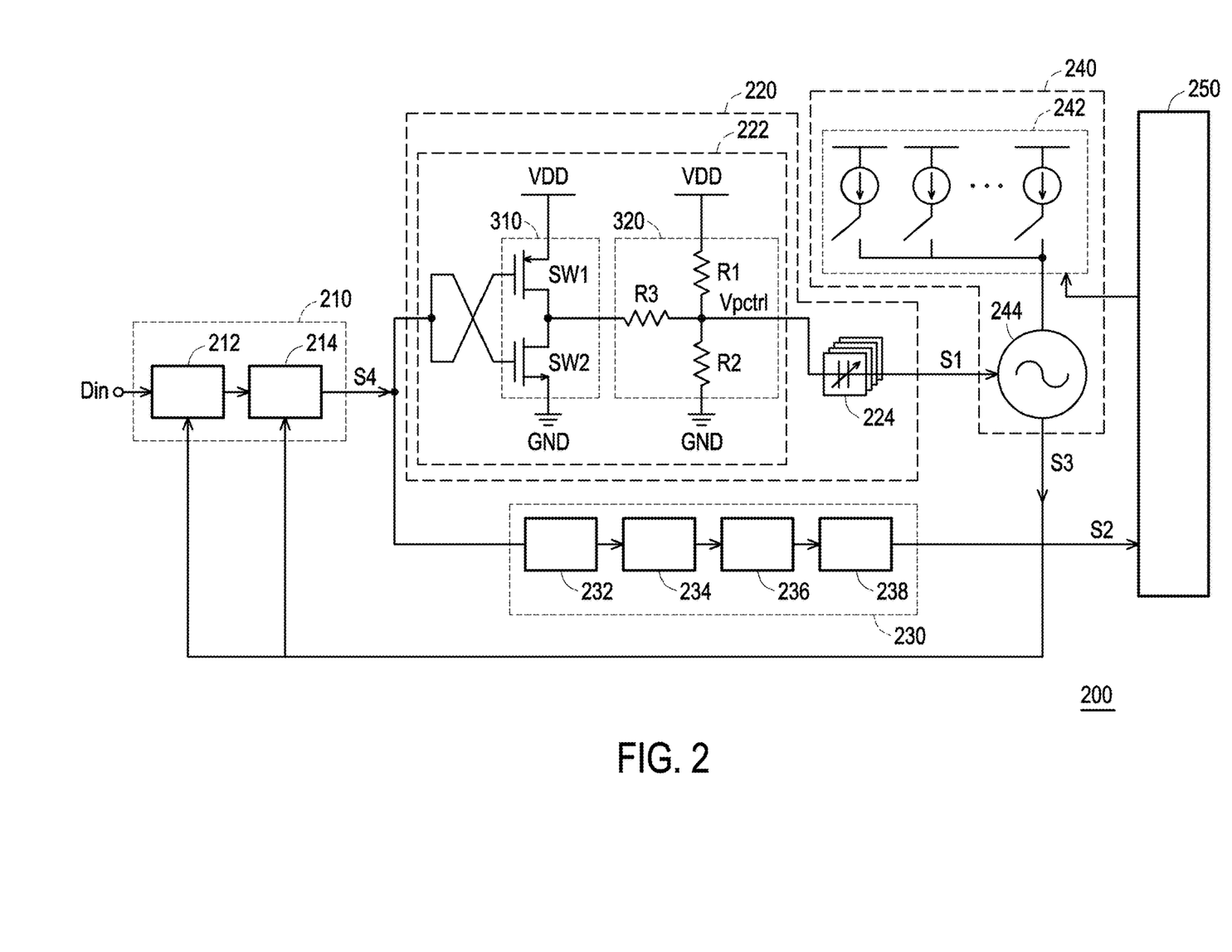
FIG. 2 is a schematic circuit view of a CDR circuit according to another embodiment of the disclosure.

FIG. 2 is a schematic circuit view of a CDR circuit according to another embodiment of the disclosure. With reference to FIG. 2, in this embodiment, a phase detector circuit 210 includes a sampling circuit 212 and a phase detector 214. The sampling circuit 212 samples the input data Din based on the oscillation signal S3, and the phase detector 214 performs phase detection on a sampled result based on the oscillation signal S3, so as to output the detection result S4. In an embodiment, the phase detector 214 is, for instance, a bang-bang phase detector.

The proportional path 220 includes a charge pump circuit 222 and a variable capacitor 224. The charge pump circuit 222 includes a switch circuit 310 and a voltage divider circuit 320. The voltage divider circuit 320 is configured to divide a difference between a first voltage VDD and a second voltage GND and may generate the voltage control signal Vpctrl with different voltages according to an ON state of the switch circuit 310. A capacitance of the variable capacitor 224, which serves as the proportional control signal S1, varies according to a variation of a voltage of the voltage control signal Vpctrl. The detection result S4 output by the phase detector circuit 210 includes a first switch control signal UP and a second switch control signal DN. The first switch control signal UP and the second switch control signal DN are output to the switch circuit 310, which respectively serve to control an ON state of the first switch device SW1 and an ON state of the second switch device SW2.

The integral path 230 includes a demultiplexer 232, a decoder 234, an accumulator 236, and a modulator 238. The detection result S4 output by the phase detector circuit 210 includes clock information and data information. The demultiplexer 232 reduces the rate of an output signal of the phase detector circuit 210 down to a plurality of signals, which are then decoded by the decoder 234. An output signal of the decoder 234 goes through the accumulator 236, and the resolution of the output signal is adjusted by the modulator 238. In an embodiment, the modulator 238 is, for instance, a delta-sigma modulator.

The oscillator circuit 240 includes a current source 242, an oscillator 244, and a variable capacitor 242. The integral control signal S2 of the integral path 230 may be output to a digital circuit 250. The digital circuit 250 adjusts a current provided to the oscillator 244 by the current source 242 according to the integral control signal S2, thereby achieving tracking and locking the frequency of the input data Din.

In an embodiment, the digital circuit 250 may be implemented as a logic circuit on an integrated circuit. For instance, the following hardware may be applied to implement the relevant functions of the digital circuit 250: one or more controllers, microcontrollers, microprocessors, application-specific integrated circuits (ASIC), digital signal processors (DSP), field programmable gate arrays (FPGA), central processing units (CPU), or various logic blocks, modules, and circuits in other processing units. The relevant functions of the digital circuit 250 may be implemented as hardware circuits, such as various logic blocks, modules, and circuits in the integrated circuit, for instance, through a hardware description language (HDL), e.g., Verilog HDL or a very high-speed integrated circuit (VHSIC) hardware description language (VHDL), or any other suitable programming language.

Figure 3:
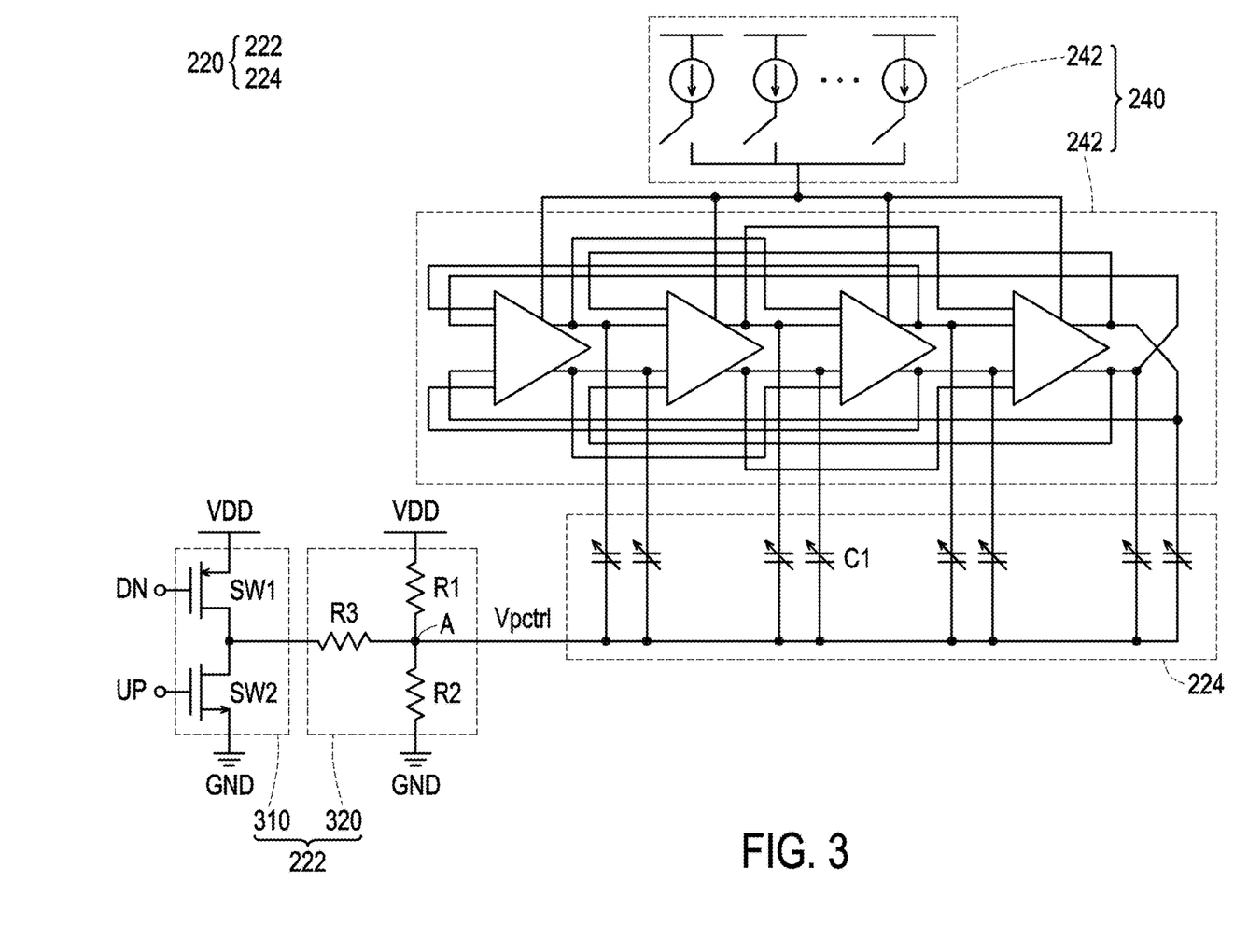
FIG. 3 is a schematic circuit view of the proportional path and the oscillator circuit provided in the embodiment depicted in FIG. 2.

Reference of detailed operations and circuit structures of the proportional path 220 and the oscillator circuit 240 may be further made to FIG. 3. FIG. 3 is a schematic circuit view of the proportional path and the oscillator circuit provided in the embodiment depicted in FIG. 2. With reference to FIG. 2 and FIG. 3, in this embodiment, the oscillator 244 is, for instance, a four-stage feedforward ring oscillator circuit. The structure of the oscillator 244 should however not be construed as a limitation in the disclosure.

The switch circuit 222 includes a first switch device SW1 and a second switch device SW2. The first switch device SW1 has a first terminal, a second terminal, and a control terminal. The first terminal of the first switch device SW1 is coupled to the first voltage VDD. The second terminal of the first switch device SW1 is coupled to the first terminal of the second switch device SW2. The control terminal of the first switch device SW1 is coupled to the first switch control signal DN. The first switch control signal DN is configured to control an ON state of the first switch device SW1. The second switch device SW2 has a first terminal, a second terminal, and a control terminal. The first terminal of the second switch device SW2 is coupled to the second terminal of the first switch device SW1. The second terminal of the second switch device SW2 is coupled to the second voltage GND. The control terminal of the second switch device SW2 is coupled to the second switch control signal UP. Here, the first voltage VDD is greater than the second voltage GND.

The voltage divider circuit 320 includes a first resistor device R1, a second resistor device R2, and a third resistor device R3. In an embodiment, a resistance of the third resistor device R3 may be designed to be greater than or equal to a resistance of the first resistor device R1 and a resistance of the second resistor device R2, and the resistance of the first resistor device R1 may be designed to be equal to the resistance of the second resistor device. For instance, when the resistance of the first resistor device R1 is equal to the resistance of the second resistor device R2, the resistance of the third resistor device R3 may be K times the resistance of the first resistor device R1 or K times the resistance of the second resistor device R2, where K is an integer greater than or equal to 1.

Specifically, the first resistor device R1 has a first terminal and a second terminal. The first terminal of the first resistor device R1 is coupled to the first voltage VDD. The second terminal (a node A) of the first resistor device R1 is coupled to the first terminal of the second resistor device R2. The second resistor device R2 has a first terminal and a second terminal. The first terminal of the second resistor device R2 is coupled to the second terminal of the first resistor device R1. The second terminal of the second resistor device R2 is coupled to the second voltage GND. The third resistor device R3 has a first terminal and a second terminal. The first terminal of the third resistor device R3 is coupled to the second terminal of the first switch device SW1 or the first terminal of the second switch device SW2. The second terminal of the third resistor device is coupled to the second terminal of the first resistor device R1 or the first terminal of the second resistor device R2.

The voltage divider circuit 320 is configured to divide the difference between the first voltage VDD and the second voltage GND and generate the voltage control signal Vpctrl at the node A. In this embodiment, the voltage divider circuit 320 may generate the voltage control signal Vpctrl with different voltages according to an ON state of the switch circuit 310. The voltage control signal Vpctrl is output to the variable capacitor 224 to adjust a capacitance of the variable capacitor 224.

Figure 4A:
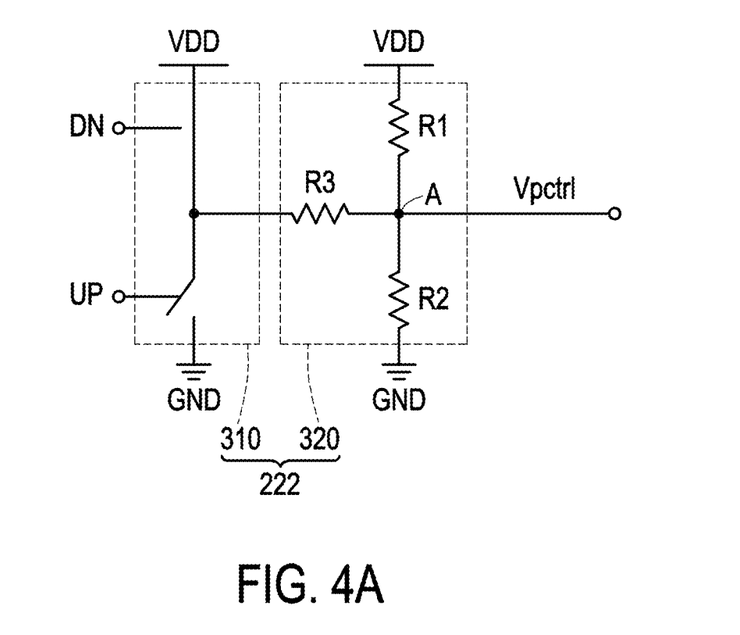
FIG. 4A is a schematic circuit view illustrating that the switch circuit provided in the embodiment depicted in FIG. 3 is in a first ON state.
Figure 4B:
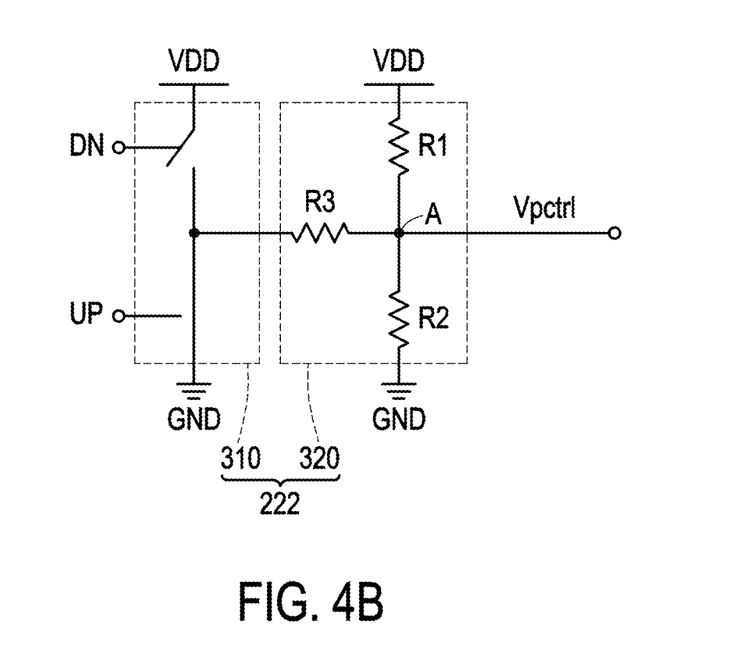
FIG. 4B is a schematic circuit view illustrating that the switch circuit provided in the embodiment depicted in FIG. 3 is in a second ON state.

FIG. 4A is a schematic circuit view illustrating that the switch circuit provided in the embodiment depicted in FIG. 3 is in a first ON state. FIG. 4B is a schematic circuit view illustrating that the switch circuit provided in the embodiment depicted in FIG. 3 is in a second ON state. With reference to FIG. 3 to FIG. 4B, in FIG. 4A, the switch circuit 310 is in the first ON state; that is, the first switch device SW1 is turned on and the second switch device SW2 is not turned on. When the switch circuit 310 is in the first ON state, the voltage divider circuit 310 provides the voltage control signal Vpctrl with a first voltage value V1. Here, if it is assumed that the resistance of the first resistor device R1 is equal to the resistance of the second resistor device R2, and the resistance of the third resistor device R3 is K times the resistance of the first resistor device R1 or K times the resistance of the second resistor device R2, then the first voltage value V1 may be calculated as:

$$V1 = \frac{1+K}{1+2K} VDD$$

Here, VDD is the value of the first voltage. In addition, a first voltage variable $K_{CP,DN}$ at the node A is defined as subtracting half of the VDD from the first voltage value V1, and therefore the first voltage variable $K_{CP,DN}$ at the node A may be calculated as:

$$K_{CP,DN} = \frac{1}{2+4K} VDD$$

On the other hand, in FIG. 4B, the switch circuit 310 is in the second ON state; that is, the first switch device SW1 is not turned on and the second switch device SW2 is turned on. When the switch circuit 310 is in the second ON state, the voltage divider circuit 310 provides the voltage control signal Vpctrl with a second voltage value V2. The second voltage value V2 is less than the first voltage value V1. Here, if it is also assumed that the resistance of the first resistor device R1 is equal to the resistance of the second resistor device R2, and the resistance of the third resistor device R3 is K times the resistance of the first resistor device R1 or K times the resistance of the second resistor device R2, the second voltage value V2 may be calculated as:

$$V2 = \frac{K}{1+2K} VDD$$

In addition, a second voltage variable $K_{CP,UP}$ at the node A is defined as subtracting half of the VDD from the second voltage V2, and therefore the second voltage variable $K_{CP,UP}$ at the node A may be calculated as:

$$K_{CP,UP} = \frac{-1}{2+4K} VDD$$

As such, the voltage divider circuit 320 may generate the voltage control signal Vpctrl with different voltage values V1 and V2 according to the ON state of the switch circuit 310, so as to adjust the capacitance of the variable capacitor 224.

The variable capacitor 224 is described below. With reference to FIG. 3, the variable capacitor 224 includes a plurality of capacitors C1 coupled in parallel between the charge pump circuit 222 and the oscillator 244.

Specifically, in this embodiment, the capacitor C1 is, for instance, a PCAP variable capacitor. The PCAP variable capacitor has a MOS transistor structure, and a working principle of the PCAP variable capacitor depends on a parasitic capacitance in the MOS transistor structure. The structure of the PCAP variable capacitor is, for instance, obtained by modifying a general MOS transistor structure to enhance the parasitic capacitance. A capacitance of the PCAP variable capacitor may vary by applying a voltage. Therefore, by applying the voltage control signal Vpctrl to one terminal of the capacitor C1, the voltage of the capacitor C1 may be applied to adjust the capacitance of the capacitor C1.

Figure 5A:
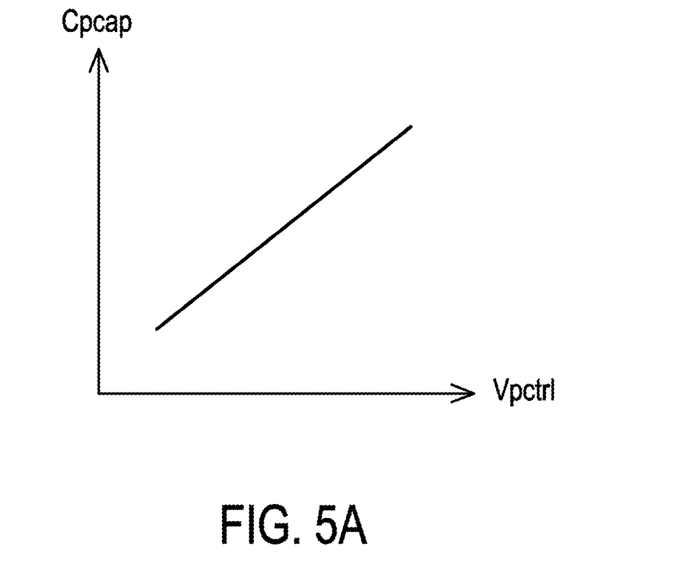
FIG. 5A is a schematic view illustrating variations of a capacitance of a variable capacitor and a voltage of a voltage control signal according to an embodiment of the disclosure.
Figure 5B:
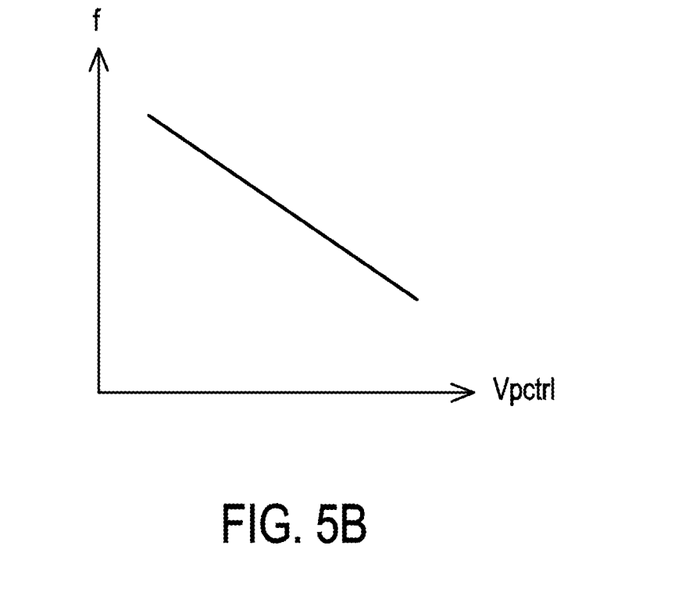
FIG. 5B is a schematic view illustrating variations of a frequency of an oscillation signal and a voltage of a voltage control signal according to an embodiment of the disclosure.

FIG. 5A is a schematic view illustrating variations of a capacitance of a variable capacitor and a voltage of a voltage control signal according to an embodiment of the disclosure. FIG. 5B is a schematic view illustrating variations of a frequency of an oscillation signal and a voltage of a voltage control signal according to an embodiment of the disclosure. With reference to FIG. 5A and FIG. 5B, in FIG. 5A, a horizontal coordinate is the voltage of the voltage control signal Vpctrl, and a vertical coordinate is an equivalent capacitance Cpcap of the variable capacitor 224; in FIG. 5B, a horizontal coordinate is the voltage of the voltage control signal Vpctrl, and a vertical coordinate is a frequency f of the oscillation signal S3.

If the capacitors C1 are the PCAP variable capacitors, for instance, the equivalent capacitance Cpcap of the variable capacitor 224 varies in a linear relationship with respect to the variation of the voltage of the voltage control signal Vpctrl; for instance, the linear relationship is a proportional relationship, i.e., the larger the voltage, the larger the capacitance Cpcap, as shown in FIG. 5A.

On the other hand, since the frequency of the oscillation signal S3 generated by the oscillator circuit 244 is proportional to a reciprocal of an overall resistance-capacitance (the product of the resistance and the capacitance) of the circuit, the frequency f of the oscillation signal S3 also varies in a linear relationship with respect to the variation of the voltage of the voltage control signal Vpctrl; for instance, the linear relationship is an inversely proportional relationship, i.e., the larger the voltage, the smaller the frequency f, as shown in FIG. 5B.

In the embodiment depicted in FIG. 3, the capacitors C1 are exemplified by the PCAP variable capacitors, which should however not be construed as a limitation in the disclosure. In an embodiment, the capacitors C1 may also be implemented as NCAP variable capacitors.

Figure 6A:
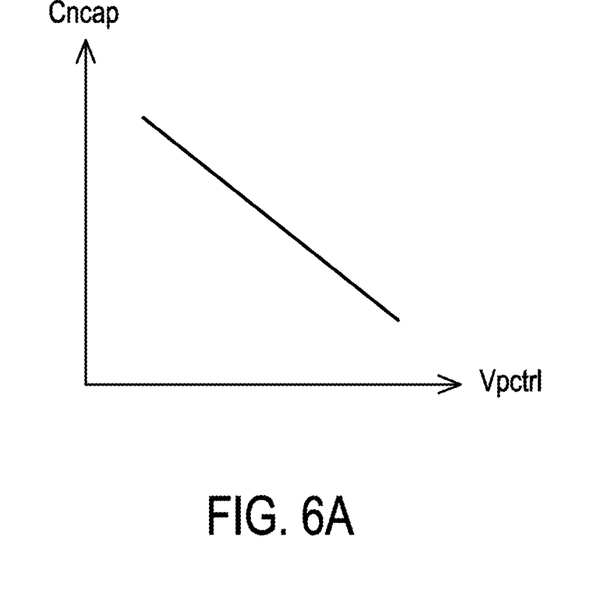
FIG. 6A is a schematic view illustrating variations of a capacitance of a variable capacitor and a voltage of a voltage control signal according to another embodiment of the disclosure.
Figure 6B:
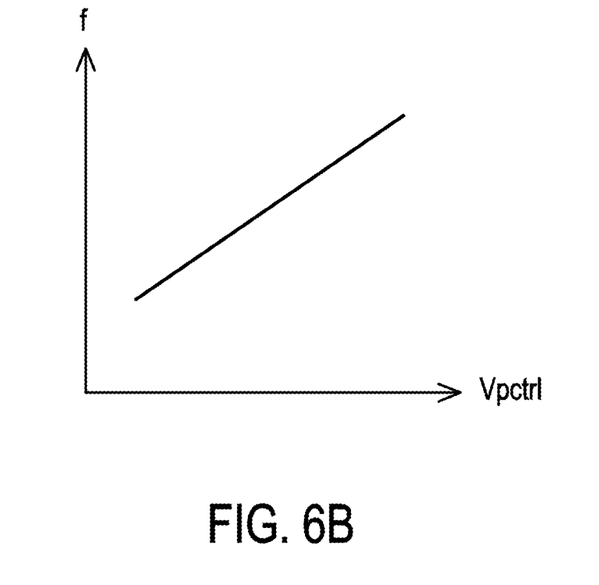
FIG. 6B is a schematic view illustrating variations of a frequency of an oscillation signal and a voltage of a voltage control signal according to another embodiment of the disclosure.

FIG. 6A is a schematic view illustrating variations of a capacitance of a variable capacitor and a voltage of a voltage control signal according to another embodiment of the disclosure. FIG. 6B is a schematic view illustrating variations of a frequency of an oscillation signal and a voltage of a voltage control signal according to another embodiment of the disclosure. With reference to FIG. 6A and FIG. 6B, in FIG. 6A, a horizontal coordinate is the voltage of the voltage control signal Vpctrl, and a vertical coordinate is the equivalent capacitance Cncap of the variable capacitor 224 implemented as an NCAP variable capacitor; in FIG. 6B, a horizontal coordinate is the voltage of the voltage control signal Vpctrl, and a vertical coordinate is the frequency f of the oscillation signal S3.

If the capacitors C1 are NCAP variable capacitors, for instance, the equivalent capacitance Cncap of the variable capacitor 224 also varies in a linear relationship with respect to the variation of the voltage of the voltage control signal Vpctrl; for instance, the linear relationship is an inversely proportional relationship, i.e., the larger the voltage, the smaller the capacitance Cncap, as shown in FIG. 6A.

Similarly, since the frequency of the oscillation signal S3 generated by the oscillator circuit 244 is inversely proportional to the overall resistance-capacitance of the circuit, the frequency f of the oscillation signal S3 also varies in a linear relationship with respect to the variation of the voltage of the voltage control signal Vpctrl; for instance, the linear relationship is a proportional relationship, i.e., the larger the voltage, the larger the frequency f, as shown in FIG. 6B.

To sum up, in one or more embodiments of the disclosure, the proportional path includes the charge pump circuit and the variable capacitor. The charge pump circuit generates the voltage control signal based on the detection result of the phase detector circuit to adjust the capacitance of the variable capacitor, thereby adjusting the frequency of the oscillation signal. As such, the influence of the parasitic capacitance on the gain of the proportional path may be reduced, thereby improving the accuracy of data sampling in the CDR circuit. In addition, the charge pump circuit provided in one or more embodiments of the disclosure is a voltage-mode charge pump, which has a simple structure and occupies a reduced chip area.

Although the disclosure has been described above through embodiments, the embodiments do not serve to pose any limitation in the disclosure. Those with ordinary knowledge in the pertinent technical field are able to make some modifications to the disclosed embodiments without departing from the spirit and scope of the disclosure, and therefore the protection scope provided in the disclosure shall be determined by the following claims and their equivalents.

What is claimed is:

1. A clock data recovery circuit, comprising:
   a phase detector circuit, configured to receive input data and detect the input data based on an oscillation signal to output a detection result;
   a proportional path, configured to output a proportional control signal based on the detection result, wherein the proportional path comprises a charge pump circuit and a variable capacitor, the charge pump circuit generates a voltage control signal based on the detection result, and the variable capacitor generates a proportional control signal based on the voltage control signal;
   an integral path, configured to output an integral control signal based on the detection result; and
   an oscillator circuit, coupled to the proportional path and the integral path and configured to generate the oscillation signal based on the proportional control signal and the integral control signal,
   wherein the charge pump circuit comprises a switch circuit and a voltage divider circuit, and the voltage divider circuit generates the voltage control signal with different voltages based on an ON state of the switch circuit.

2. The clock data recovery circuit according to claim 1, wherein the switch circuit has a first ON state and a second ON state, and
   when the switch circuit is in the first ON state, the voltage divider circuit provides the voltage control signal with a first voltage; when the switch circuit is in the second ON state, the voltage divider circuit provides the voltage control signal with a second voltage, wherein the second voltage is less than the first voltage.

3. The clock data recovery circuit according to claim 2, wherein the switch circuit comprises:
   a first switch device, having a first terminal, a second terminal, and a control terminal, wherein the first terminal of the first switch device is coupled to the first voltage, and the control terminal of the first switch device is coupled to a first switch control signal; and
   a second switch device, having a first terminal, a second terminal, and a control terminal, wherein the first terminal of the second switch device is coupled to the second terminal of the first switch device, the second terminal of the second switch device is coupled to the second voltage, and the control terminal of the second switch device is coupled to a second switch control signal, wherein the first voltage is greater than the second voltage.

4. The clock data recovery circuit according to claim 3, wherein the detection result comprises the first switch control signal and the second switch control signal respectively configured to control an ON state of the first switch device and an ON state of the second switch device.

5. The clock data recovery circuit according to claim 3, wherein the voltage divider circuit comprises:
   a first resistor device, having a first terminal and a second terminal, wherein the first terminal of the first resistor device is coupled to the first voltage;
   a second resistor device, having a first terminal and a second terminal, wherein the first terminal of the second resistor device is coupled to the second terminal of the first resistor device, and the second terminal of the second resistor device is coupled to the second voltage; and
   a third resistor device, having a first terminal and a second terminal, wherein the first terminal of the third resistor device is coupled to the second terminal of the first switch device, and the second terminal of the third resistor device is coupled to the second terminal of the first resistor device.

6. The clock data recovery circuit according to claim 5, wherein a resistance of the third resistor device is greater than or equal to a resistance of the first resistor device and a resistance of the second resistor device, and the resistance of the first resistor device is equal to the resistance of the second resistor device.

7. The clock data recovery circuit according to claim 1, wherein the variable capacitor comprises a plurality of capacitors coupled in parallel between the charge pump circuit and the oscillator circuit.

8. The clock data recovery circuit according to claim 1, wherein a capacitance of the variable capacitor varies according to a variation of a voltage of the voltage control signal.

9. The clock data recovery circuit according to claim 8, wherein the capacitance of the variable capacitor varies in a linear relationship with respect to the variation of the voltage of the voltage control signal.

10. A clock data recovery circuit, comprising:
a phase detector circuit, configured to receive input data and detect the input data based on an oscillation signal to output a detection result;
a proportional path, configured to output a proportional control signal based on the detection result, wherein the proportional path comprises a charge pump circuit and a variable capacitor, the charge pump circuit generates a voltage control signal based on the detection result, and the variable capacitor generates a proportional control signal based on the voltage control signal;
an integral path, configured to output an integral control signal based on the detection result; and
an oscillator circuit, coupled to the proportional path and the integral path and configured to generate the oscillation signal based on the proportional control signal and the integral control signal,
wherein the variable capacitor comprises a plurality of capacitors coupled in parallel between the charge pump circuit and the oscillator circuit.

11. The clock data recovery circuit according to claim 10, wherein the charge pump circuit comprises a switch circuit and a voltage divider circuit, and the voltage divider circuit generates the voltage control signal with different voltages based on an ON state of the switch circuit.

12. The clock data recovery circuit according to claim 11, wherein the switch circuit has a first ON state and a second ON state, and
when the switch circuit is in the first ON state, the voltage divider circuit provides the voltage control signal with a first voltage; when the switch circuit is in the second ON state, the voltage divider circuit provides the voltage control signal with a second voltage, wherein the second voltage is less than the first voltage.

13. The clock data recovery circuit according to claim 12, wherein the switch circuit comprises:
a first switch device, having a first terminal, a second terminal, and a control terminal, wherein the first terminal of the first switch device is coupled to the first voltage, and the control terminal of the first switch device is coupled to a first switch control signal; and
a second switch device, having a first terminal, a second terminal, and a control terminal, wherein the first terminal of the second switch device is coupled to the second terminal of the first switch device, the second terminal of the second switch device is coupled to the second voltage, and the control terminal of the second switch device is coupled to a second switch control signal, wherein the first voltage is greater than the second voltage.

14. The clock data recovery circuit according to claim 13, wherein the detection result comprises the first switch control signal and the second switch control signal respectively configured to control an ON state of the first switch device and an ON state of the second switch device.

15. A clock data recovery circuit, comprising:
a phase detector circuit, configured to receive input data and detect the input data based on an oscillation signal to output a detection result;
a proportional path, configured to output a proportional control signal based on the detection result, wherein the proportional path comprises a charge pump circuit and a variable capacitor, the charge pump circuit generates a voltage control signal based on the detection result, and the variable capacitor generates a proportional control signal based on the voltage control signal;
an integral path, configured to output an integral control signal based on the detection result; and
an oscillator circuit, coupled to the proportional path and the integral path and configured to generate the oscillation signal based on the proportional control signal and the integral control signal,
wherein a capacitance of the variable capacitor varies according to a variation of a voltage of the voltage control signal.

16. The clock data recovery circuit according to claim 15, wherein the charge pump circuit comprises a switch circuit and a voltage divider circuit, and the voltage divider circuit generates the voltage control signal with different voltages based on an ON state of the switch circuit.

17. The clock data recovery circuit according to claim 16, wherein the switch circuit has a first ON state and a second ON state, and
when the switch circuit is in the first ON state, the voltage divider circuit provides the voltage control signal with a first voltage; when the switch circuit is in the second ON state, the voltage divider circuit provides the voltage control signal with a second voltage, wherein the second voltage is less than the first voltage.

18. The clock data recovery circuit according to claim 17, wherein the switch circuit comprises:
a first switch device, having a first terminal, a second terminal, and a control terminal, wherein the first terminal of the first switch device is coupled to the first voltage, and the control terminal of the first switch device is coupled to a first switch control signal; and
a second switch device, having a first terminal, a second terminal, and a control terminal, wherein the first terminal of the second switch device is coupled to the second terminal of the first switch device, the second terminal of the second switch device is coupled to the second voltage, and the control terminal of the second switch device is coupled to a second switch control signal, wherein the first voltage is greater than the second voltage.

19. The clock data recovery circuit according to claim 18, wherein the detection result comprises the first switch control signal and the second switch control signal respectively configured to control an ON state of the first switch device and an ON state of the second switch device.

* * * * *